United States Patent [19]

Lee

[11] 4,146,483

[45] Mar. 27, 1979

[54] VIBRATING SCREEN

[76] Inventor: Joseph E. Lee, 2525 One Allen Center, Houston, Tex. 77002

[21] Appl. No.: 737,769

[22] Filed: Nov. 1, 1976

[51] Int. Cl.[2] .............................................. B01D 33/00

[52] U.S. Cl. .................................... 210/384; 210/396; 210/400; 209/272; 209/308

[58] Field of Search ............... 209/307, 308, 403, 272; 210/400, 393, 396, 401, 384, 388, 385

[56] References Cited

U.S. PATENT DOCUMENTS

| | | | |
|---|---|---|---|
| 853,782 | 5/1907 | Hall | 209/307 |
| 864,827 | 9/1907 | Callow | 209/307 |
| 864,829 | 9/1907 | Callow | 209/308 X |
| 1,706,428 | 3/1929 | Ward | 209/308 |
| 2,193,954 | 3/1940 | Warner | 209/403 X |
| 2,312,675 | 3/1942 | Scheiding | 209/272 |
| 3,225,928 | 12/1965 | Block | 209/307 X |

FOREIGN PATENT DOCUMENTS

| | | | |
|---|---|---|---|
| 1037444 | 4/1953 | France | 209/307 |
| 642556 | 9/1950 | United Kingdom | 210/400 |
| 960676 | 6/1964 | United Kingdom | 209/307 |
| 975054 | 11/1964 | United Kingdom | 209/308 |
| 360975 | 6/1969 | U.S.S.R. | 209/308 |

*Primary Examiner*—Robert Halper

[57] ABSTRACT

A segmented endless belt vibrating screen for removing solid particles from a stream of drilling fluid circulated therethrough. The endless belt is mounted on a resiliently mounted vibratory carriage. Rollers driven by a motor carry the belt. The screen is connected to the belt by a plurality of spaced hooks along the screen. A wiper and a washpipe are supplied for removing particulate from the screen.

1 Claim, 6 Drawing Figures

Fig. 3
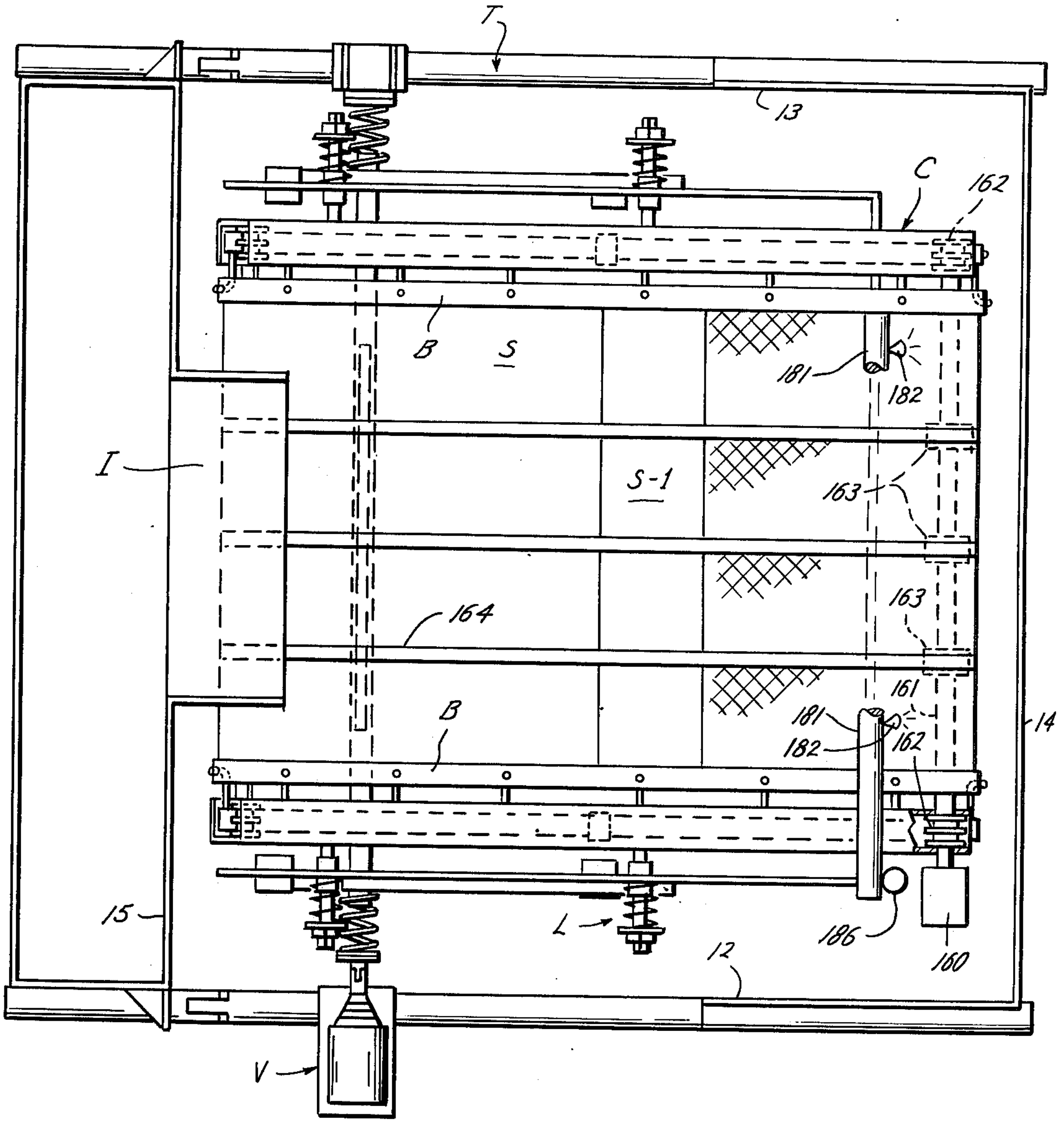
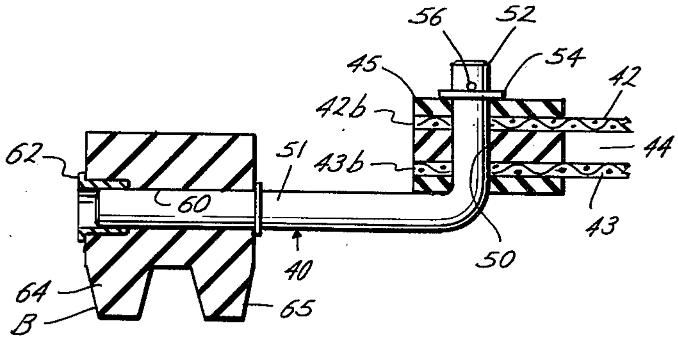
Fig. 4

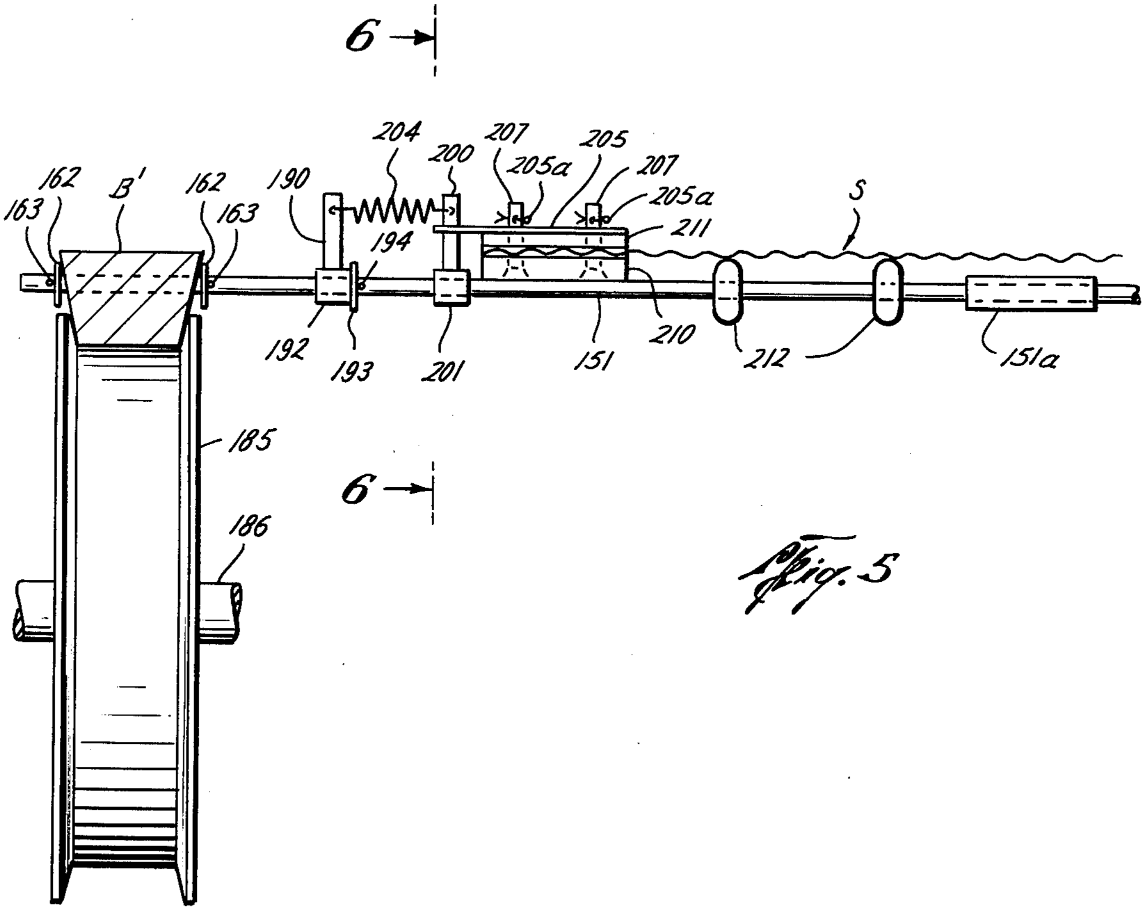
Fig. 5
Fig. 6
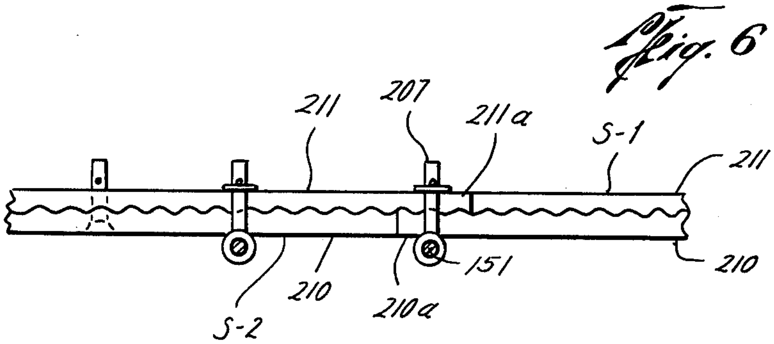

VIBRATING SCREEN

BACKGROUND OF THE INVENTION

In the past, various vibrating screen devices have been provided for removing solid particles, such as cuttings, from a stream of drilling mud normally used in the rotary drilling of oil and gas wells. As the drilling bit drills the hole, cuttings are circulated up the wellbore to the surface and are there separated from the drilling fluid which is recirculated down the drill string, out through the drill bit, and back up the annulus between the drill string and the wall of the wellbore. To prevent the cuttings from obstructing this circulating stream of drilling mud, a shaker is provided which is a vibratory screen over which the stream of cutting-laden drilling mud is circulated as it exits the wellbore at the surface.

In the past, these screens have typically been one or more panels or sheets of mesh overlaying one another through which the stream of drilling fluid is circulated to remove the particles or cuttings. The particles or cuttings are collected and disposed of and the screened drilling fluid is then recirculated through the mud pumps and back down the drill string. The problem with this arrangement is that as the cuttings collect on the screens, they become clogged and less efficient and require periodic maintenance to remove the collected cuttings and particles from the screens.

An object of the present invention is to provide an endless belt continually moving vibrating screen through which the stream of particle or cutting-laden drilling fluid is circulated and which will catch the cuttings and also transport them to a desired location and thereby keep the screen clean and prevent the accumulation of cuttings or particles on the screen that will clog it up and require a temporary shut-down or other interruption to remove the cuttings.

SUMMARY OF THE INVENTION

A segmented vibrating endless belt screen mounted in a flow tank. The upper surface of the endless belt is adjustably mounted for inclination to a desired degree from the horizontal and positioned for receiving an inlet flow at its upper end and means for removing the particles from the screen at the lower end. The endless belt screen may have one or more layers and is composed of detachable sections which are removably secured to a drive belt.

BRIEF DESCRIPTION OF THE DRAWINGS

FIG. 3 is a top view partly in section showing the vibrating endless belt screen of the present invention;

FIG. 4 is a sectional view taken on line 4—4 of FIG. 3 showing details of the endless belt construction of the present invention;

FIG. 5 is a view partly in elevation and partly in section showing an alternate embodiment for mounting the segmented screen of the present invention; and FIG. 6 is a sectional view taken on line 6—6 of FIG. 5 showing additional details of the segmented screen of the present invention.

DESCRIPTION OF THE PREFERRED EMBODIMENT

Figure 2:
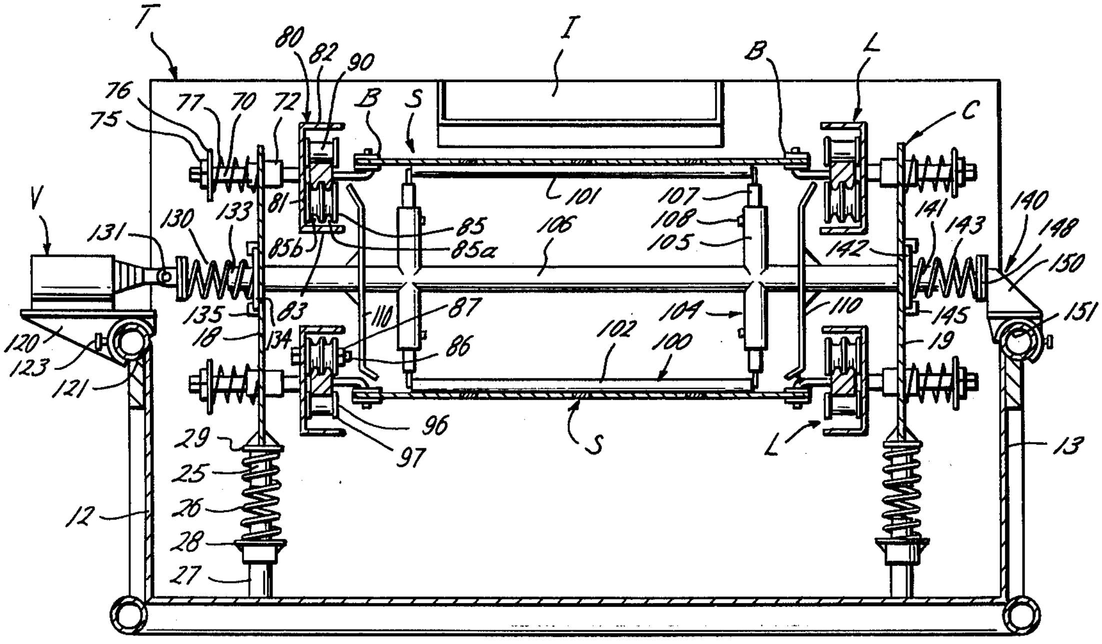
FIG. 2 is a sectional view taken on line 2—2 of FIG. 1 showing further details of the apparatus of the present invention.

As shown in FIGS. 2 and 3 of the drawings, the vibrating screen S is mounted between spaced V-belts B which are carried on a virbration carriage C which is positioned in a tank T. A stream of drilling fluid passes through an inlet I in the tank onto the screen S and out through a suitable discharge D. A wiper W engages the screen near the rear end of the tank T after the screen has been turned to an upside down position. The wiper wipes the particles or cuttings from the screen for removal from the tank T. A vibrating drive mechanism, designated generally V, vibrates the screen carriage as the screen is being turned to facilitate removal of the particles from the drilling mud.

Considering the apparatus of the present invention in more detail, the tank T comprises a four sided open-top container formed of a bottom 11, upstanding perimeter walls 12 and 13 and ends 14 and 15. The stream of cutting-laden drilling fluid flows through the inlet I and onto the screen S which is being turned clockwise as viewed in FIG. 1 by a drive motor 17, as will be described in more detail hereafter.

The carriage C comprises a pair of substantially parallel sides 18 and 19 which are vertically disposed and pivotally mounted in the tank T for pivotal movement about the swivel pins 20.

The carriage sides 18 and 19 are mounted on front and rear spring-loaded legs 22 and 24, respectively. The front legs 22 include depending pins 25 which are secured to the carriage sides at their upper end and which have their lower ends inserted into the open upper end of coil springs 26 which are mounted in an upright position with their lower open ends surrounding the upstanding legs 27. The legs 27 have an annular shoulder or ring 28 which surrounds the pin 27 and is secured thereto by welding or the like and is provided for receiving the lower end of the spring 26. An upper annular shoulder 29 is provided for receiving the upper end of the spring 26. Similarly, the rear legs 24 include depending pins 31 which are secured to the lower edge of the carriage side and which is inserted into the open upper end of the coil spring 32 which is mounted in an upstanding position with its lower open end surrounding the upstanding leg 33 that is secured to the bottom 11 of the tank T.

As shown, the rear legs 24 include a series of vertically spaced pin holes 34 which may be aligned with holes in a surrounding sleeve 35 which receive a locking pin to adjust the height of the rear of the carriage C to establish the desired pitch on the screen S.

The screen S is a segmented endless belt mounted on the carriage C by means of a plurality of hook pins 40 (FIG. 4) connected at spaced intervals along the drive belts B which are positioned on opposite sides of the screen S. The screen S comprises an endless belt which is formed of segments S' which are interconnected to form the endless belt. As shown in FIG. 4, the screen segments are formed of dual layers having an upper screen 42 and a lower screen 43. The layers are slightly staggered so that one end 42' is not directly over the end 43' so as to provide an overlapping relationship between adjacent screen segments. Further, it will be appreciated that one or more screens may be used, as desired. Also, the particular mesh of a screen may be selected as conditions may warrant.

As shown, the screen layers are stacked with a space 44 between them and are connected together at their lateral edges 42*b* and 43*b* by a vulcanized strip of rubber 45. Also, intermediate spacer strips 46 are provided between the upper and lower screens 42 and 43 to hold the space 43 open. Such spacer strips are aligned so as to lay substantially parallel to the lateral edges 42*b* and 43*b*. The vulcanized edge strip 45 is provided with spaced openings 50 for receiving the hooks 40. Such hooks 40 comprise a L-shaped member having a shank portion 51 which is disposed horizontally and an upstanding leg portion 52 which extends through the opening 50. A washer 54 surrounds the leg 52 and is held in position by a lock pin or cotter key 56 for securing the leg in the hole or opening 50. The shank end 51 of the hook extends through a laterally extending opening or passage 60 in the belt B and is secured therein by suitable cap lock 62 which may be threaded onto the end of the shank 51 or otherwise suitably secured thereto.

As will be described, the shank is held in tension by the tension lock apparatus L which in turn holds the screen S in tension.

The belt B is preferably formed of cord-reinforced rubber or other suitable material and is provided with a double V configuration having a pair of ridges 64 and 65 formed thereon to run in the double V blocks.

As shown in FIG. 2 of the drawings, the tension blocks L include a shaft 70 which is slidably mounted in sleeve 72 that is mounted in a suitable opening in the carrier side 18. Such sleeve is welded or otherwise secured to the side. The outer end of the shaft 70 is threaded and has a nut 75 and a washer 76 thereon for engaging the outer end of a coil spring 77 which surrounds the shaft 70 and has its inner end against the outer side of the carriage side 18. The inner end of the shaft 70 is secured by welding or other suitable means to a channel member 80 which includes a central web 81 and a pair of laterally extending flanges 82 and 83. A double V-grooved roller 85 is rotatably mounted on a bolt 86 which is secured to the channel member by means of a nut 87. Above the roller 85 is an idler roller 90 which is rotatably mounted on the channel member 18. The roller 85 has a pair of tapered or "V"-shaped grooves 85*a* and 85*b* formed therein for receiving the ridges 64 and 65, respectively, of the belt B. The idler roller 90 has a central cylindrical portion which engages the back or upper surface of the belt B and has a pair of spaced annular shoulders 96 and 97 which extend down along the sides of the belt B. It will be appreciated that with the idler roller down against the top of the belt B, the V-shaped projections 64 and 65 will be held in the V grooves 85*a* and 85*b* and that similarly, the annular shoulders 96 and 97 will engage the sides of the belt to apply a lateral force thereto.

Thus, with the hooks 40 in the screen S and the adjustable nuts 75 tightened on the shaft 70, tension will be imparted to the screen S. It will be appreciated that the other tension devices L, shown in FIG. 3, are substantially identical with those described hereinabove and that there are upper and lower pairs of tension devices connected to opposite sides of the screen S for imparting tension to the screen laterally towards the lateral edges. With the screen attached to the belt by the hooks at spaced points along the belt, the screen may be rotated and also held in tension by tension applied to the belt B.

A transversely extending roller assembly, designated generally 100, is provided for supporting the screen at spaced intervals. The apparatus includes upper and lower rollers 101 and 102 which support the screen in a desired position. The opposite ends of such rollers are journaled in adjustable supports 104 which comprise telescopic members carried in hollow inner shafts 105 which are secured to a central shaft 106 that extends transversely between the carriage sides 18 and 19. An outer end 107 which is telescopically received in the inner tubular member 105, is held in position at a desired elevation by means of a set screw or pin 108 which is inserted through suitable openings in both the tubular base 105 and the outer portion 107. It will be appreciated that the outer portions 107 are radially adjustable and that a plurality of openings is provided in both the hollow tubular base 105 and the outer portion 107 so that the roller 101 may be supported at a desired elevation underneath the screen S. Similarly, the roller 102 is supported by adjustable members which are identical to those described hereinabove.

The central shaft 106 is provided with mud guards or splash fenders 110 which are disposed between the lateral edges of the screen S and the tension devices L to protect the rollers in the tension device against drilling mud or other foreign substances. The ends of the shaft 106 are mounted in sockets 112 which are fixed to the inner side of the carriage walls 18 and 19.

A vibrator prime mover, designated generally V, is provided for imparting a vibratory motion to the carriage C. Such prime mover is mounted on a movable bracket 120 that is slidably mounted to the pipe 121 which is carried by the tank side 12. Bolts 123 or other suitable adjustable securing means are provided for securing the bracket 120 at a desired position on the pipe 121. The vibratory prime mover is operably connected to the carriage side 18 by a spring coupling 130 which has a pin 131 for connecting the prime mover to one end of the spring 130 and which has a short shaft 133 telescopically inserted into the spring 130 with its outer end affixed to a plate 134 that is slidably mounted in the track 135 that is secured to the outer surface of the carriage side 18.

A vibratory guide 140 is provided adjacent the opposite end of the central shaft 106. Such vibratory guide includes a countershaft 141 having a plate 142 affixed to its inner end and a spring 143 affixed to the other. The plate 142 is carried in a track 145 on the outer side of the carriage side 19. The side 19 is aligned with the track 135 to permit alignment of the vibratory guide 140 opposite the vibratory prime mover 130.

The outer end of the spring 143 is affixed to a plate 148 which is secured to adjustable bracket 150 that is movable along the pipe 151 at the outer edge of the tank side 13. With this arrangement, the vibratory prime mover can be positioned at some selected location along the track 135 and the guide 140 may be positioned in alignment with the vibratory prime mover.

A drive motor 160 is mounted with the carriage C and drives a shaft 161 which is provided with a pair of double V-belt roller drives 162 for driving the belts B and is also provided with intermediate roller drives 163 which engage the screen adjacent the longitudinally extending rubber-type screen spacer supports 164. Upon rotation of the shaft 161 by the drive motor, the belt B moves the screen S attached thereto so as to provide a moving endless belt screen onto which the stream of cutting-laden drilling fluid flows through the inlet I.

Figure 1:
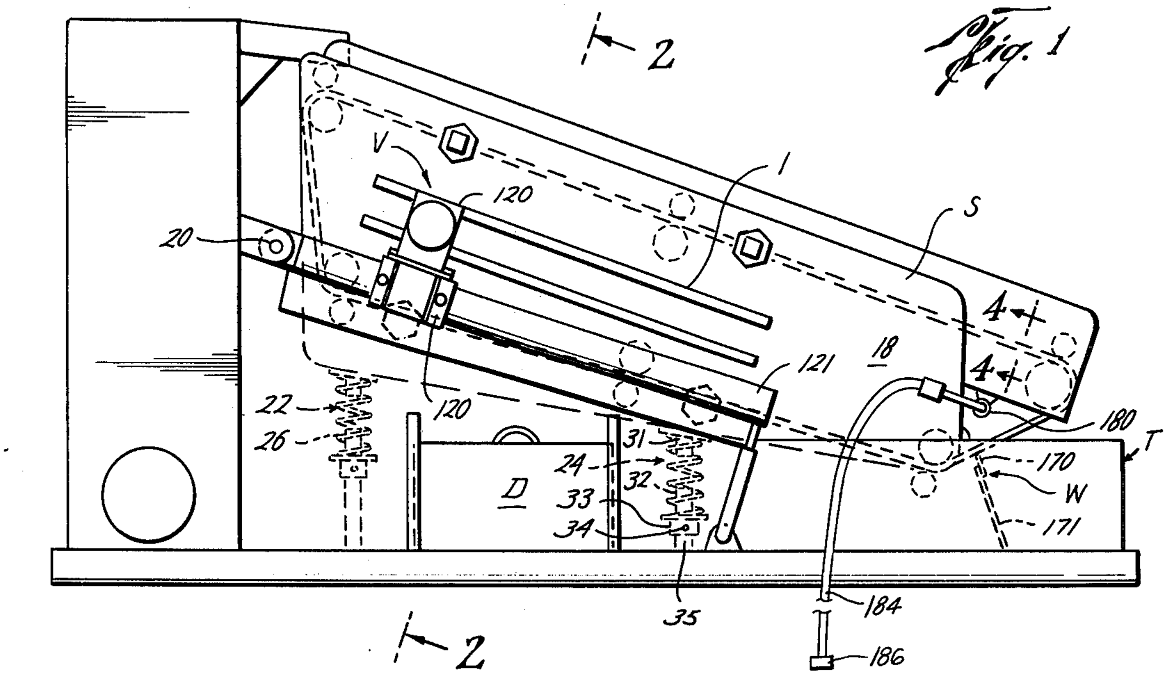
FIG. 1 is a side view partly in section and partly in elevation showing the apparatus of the present invention.

Also, as shown in FIG. 1 of the drawings, the wiper W is provided near the lower end of the screen S for wiping and removing particles from the screen as it passes thereover. Such wiper W comprises a transversely extending flexible screed 170 formed of rubber or other suitable resilient material which is mounted on a wiper support 171 affixed to the bottom 11 of the tank T. Above the wiper W there is provided a screen washer 180 which includes a transversely extending washpipe 181 that extends across the full width of the screen S and has a plurality of nozzles 182 attached to the washpipe 181. Such nozzles 182 direct a spray of water onto the screen at a point prior to that which is engaged by the wiper 170 to facilitate the washing and removal of particles and debris from the screen S as it moves over the wiper W. The washpipe 181 is connected by a suitable hose or tube 184 to a pressure water supply source which furnishes a continuous stream of pressurized water to the washpipe 181. The hose is connected to a suitable water inlet 186 which may in turn be connected to a suitable source of pressurized washwater.

An alternate embodiment of the apparatus of the present invention is shown in FIGS. 5 and 6 of the drawings in which the screen S is carried on a plurality of drive belt spacer rods 151 which are mounted on belts B'. As shown, the belts B' are mounted on suitable rollers 185 carried on axle 186 mounted on the channel members 80; however, sprockets and a chain drive may be substituted for the belt and pulley or roller arrangement as shown.

It will be appreciated that there are a plurality of the drive belt spacer rods 151 which are spaced along the belts B' for supporting the screen S at suitable intervals.

As shown in FIG. 5 of the drawings, the end of the rod 151 extends transversely through a suitable opening in the belt B and is secured therein by means of spaced washers 162 that are held in position by means of transverse cotter keys or pins 163 extending through the rod 151. A fixed spring anchor rod 190 is mounted on the drive belt spacer rod 151 by means of a sleeve 192. A washer 193 is positioned on the rod and abuts against a cotter key or pin 194 to limit travel of the anchor 190 toward the screen S. A movable hook coupling rod 200 which is similar to the anchor rod 190 is also mounted on the drive belt spacer rod 151 by means of a suitable sleeve 201. However, the hook coupling rod 200 is free to travel axially along the rod 151. A spring 204 connects the upper end of the anchor rod 190 with the upper end of the travel rod 200 to urge the travel rod 200 toward the anchor rod 190.

The travel rod 200 is connected by means of a connector bar 205 to a pair of hook connector rods or pins 207 which are mounted in the lower vulcanized strip 210 and which project upwardly through suitable openings in the upper vulcanized strip 211, such strips extending along the edges of the screen segments, as will be described in detail hereinafter. The pins 207 project upwardly through suitable openings in the connector bar 205 and are held therein by means of cotter keys 205*a* which may be removed to replace particular screen segments, as desired.

Also, as shown in FIG. 5 of the drawings, the drive belt spacer rod is provided with a plurality of spaced washer-type screen cushions 212 which support the screen at spaced points along the rod 151. Also, a roller sleeve 151*a* is provided on the rod 151 for receiving longitudinally extending support belts, if desired.

It will be appreciated that the opposite end of the rod 151 is provided with suitable connecting arrangement as has been described hereinabove for securing the opposite edge of the screen S with respect to the rod 151 and for imposing a tension stress across the screen S. Thus, it will be appreciated that another spring, such as that illustrated at 204, may be provided for imparting tension to the other edge of the screen S if desired.

As shown in FIG. 6 of the drawings, the segmented screen S includes a plurality of segments, designated S-1 and S-2 in FIG. 6, each of which has upper and lower vulcanized edge strips 211 and 210, respectively. As shown in FIG. 6, the end 211*a* of the segment S-2 overlaps the lower end 210*a* of the segment S-1 and a locking pin 207 extends therethrough for securing the overlapping vulcanized strips together. Further, as shown in FIG. 6 of the drawings, the facing or mating edges of the upper and lower strips 210 and 211 are provided with a corrugated interlocking surface to further secure such strips together and resist longitudinal movement of one relative to the other. It will be appreciated that with this arrangement segments of the screen S may be removed from the endless segmented screen and replaced as they become worn or clogged to enable the screen as to be repaired or renewed without having to be entirely replaced. Further, with the apparatus of the present invention, it will be appreciated that such segments may be changed out relatively easily without having to remove the entire screen S from the vibrator. Also, as the tension springs 204 become worn, they may be quickly and easily replaced with new springs to maintain the desired transverse tension on the screen S.

In operation of the apparatus of the present invention, the drive motor 160 drives the belt B to which the segmented screen S is affixed and thereby causes the screen S to move continuously past the inlet I to receive a flow of cutting-laden drilling mud. The vibrator prime mover is actuated to cause the carriage C to reciprocate in a direction which is generally transverse to the flow of drilling fluid across the screen and to thereby facilitate the separation of solid particles from the stream of drilling fluid. It will be appreciated that the upper portion of the screen S is disposed in an inclined or tilted position with respect to the inlet I so as to cause a natural bed for the flowing stream of drilling fluid from the top to the lower end of the screen. As the fluid flows over the moving screen, it is vibrated violently to shake the stream carried thereby and thus facilitate the settling out of the various solid particles from the stream of drilling fluid as it passes over the movable screen S. Further, it will be appreciated that the entire carriage C may be pivoted about the pivot points 20 to raise or lower the slope of the bed formed by the screen S and similarly, it will be appreciated that the vibratory prime mover V is slidably mounted with respect to the carriage C and may be moved along the carriage to a desired position for a given set of circumstances.

Further, it will be appreciated that the segmented screen S provides a means for quickly and easily removing portions of the screen in the event they become clogged or damaged or, for removing the entire screen and replacing it with a screen of a different mesh size should that be desired. Further, it will be appreciated that the upper screen and the lower screen may be of different mesh sizes if desired.

The foregoing disclosure and description of the invention are illustrative and explanatory thereof, and various changes in the size, shape, and materials as well as in the details of the illustrated construction may be made without departing from the spirit and scope of the invention.

What is claimed is:

1. A vibratory screen separator, including:

(a) an open-top tank having a bottom and sides for receiving a stream of particle-laden drilling fluid;

(b) a vibratory carriage mounted in said tank;

(c) an endless V belt screen mounted on said carriage for movement therealong;

(d) flexible belt means on opposite sides of said endless screen belt connected thereto;

(e) roller means for carrying said V-belt;

(f) motor means for driving one of said roller means; and (f') a vibratory prime mover operably connected to said carriage for imparting a vibratory motion to the carriage and said screen carried thereby while said screen is being moved along said carriage;

(g) a plurality of hooks at spaced intervals along the screen, said hooks having a shank portion secured to said belt and a leg portion disposed at substantially a right angle to said shank and connected to said screen and (h) wiper means for engaging said screen belt to wipe particulate from said screen.

* * * * *